United States Patent [19]

Fascenda et al.

[11] Patent Number: 4,845,491
[45] Date of Patent: Jul. 4, 1989

[54] PAGER BASED INFORMATION SYSTEM

[75] Inventors: Anthony C. Fascenda, Pacifica; Daniel L. Gregg, San Francisco, both of Calif.

[73] Assignee: Newspager Corporation of America, South San Francisco, Calif.

[21] Appl. No.: 50,826

[22] Filed: May 15, 1987

[51] Int. Cl.$^4$ .............................................. H04Q 7/00
[52] U.S. Cl. ........................... 340/825.44; 340/825.27; 340/825.47; 358/86
[58] Field of Search ....................... 340/825.44, 825.52, 340/825.26, 825.27, 825.47; 368/46, 47; 358/86; 379/57

[56] References Cited

U.S. PATENT DOCUMENTS

| | | | |
|---|---|---|---|
| 4,473,824 | 9/1984 | Claytor | 340/825.27 |
| 4,602,340 | 7/1986 | Appelberg | 340/825.52 |
| 4,677,434 | 6/1987 | Fascenda | 340/825.27 |
| 4,706,272 | 11/1987 | Nishimura et al. | 340/825.44 |

FOREIGN PATENT DOCUMENTS 2110851  6/1983  United Kingdom ........... 340/825.44

OTHER PUBLICATIONS

Advertising Pamphlet for Motorola, Alphamate Message Entry Device, Copyright 1987.
Advertising Flier for Motorola, PMR 2000, Copyright 1986.
Instruction Manual for Motorola PMR 2000, Copyright 1987.
High Technology, "Radio Pagers Expand Horizons", 03/83, pp. 44-47.
Popular Science, QuoTrek Over-The-Air Data at Your Fingertips, J. Schefter, pp. 70 & following, (undated).
USA Today Sports Page article, Jan. 4, 1988, Advertising flier for sports page from Beeper Plus, undated.

*Primary Examiner*—Donald J. Yusko
*Attorney, Agent, or Firm*—Townsend and Townsend

[57] ABSTRACT

A pager based information system is used to transmit both conventional private messages (using unique pager IDs) and two types of unconventional multi-recipient (M-R) messages (using database IDs and group IDs), all using the conventional POCSAG pager transmission format. Operation of the pager is software controlled through the use of a microprocessor and a RAM; auxiliary chips are not needed because of the relatively slow transmission speeds. Authority to receive the M-R messages is provided at the time of manufacture (database IDs) or via broadcasts (group IDs). Database type M-R messages are stored in the pager RAM in a hierarchial or tree structure. The software controlled pagers permit the over-the-air modification of the operation of selected pagers, such as the addition or deletion of group IDs and the change in the tree structure of the storage area for the database messages. The pager includes a real time pager clock which is update by pairs of broadcast time messages, the second having a time correction for the first.

30 Claims, 6 Drawing Sheets

PAGER BASED INFORMATION SYSTEM

BACKGROUND OF THE INVENTION

Paging systems, which come in various levels of sophistication, have certain features in common. Individual subscribers to a paging system have pagers for receiving the paging system broadcasts. Each pager has a unique, permanent ID stored in the read only memory (ROM) of the pager. All the pagers in an area monitor broadcast messages from a central transmitter. Each message is intended for a particular pager and has that pager's ID associated with the message. Thus, pagers in an area all monitor a certain frequency for broadcasts from the pager system transmitter looking for its particular ID. When the ID is present, that is when the ID is broadcast by the transmitter, the message associated with the ID, which typically follows the ID, is acted upon by the pager.

The most basic type of pager is called a beeper. The message is simply an instruction to actuate the pager causing it to emit the familiar beep, illuminate an LED, or both. Another type of pager system is used to transmit numeric messages, typically a telephone number the recipient is to call. When the individual pager receives that pager's ID, the accompanying message is typically stored in a read/write memory in the pager and displayed (then or later) on the pager's numeric display. More recently alphanumeric pagers have been introduced. The messages associated with these pager systems include both number and word messages which are received and stored by the recipient pager for display immediately or later.

Figure 2:
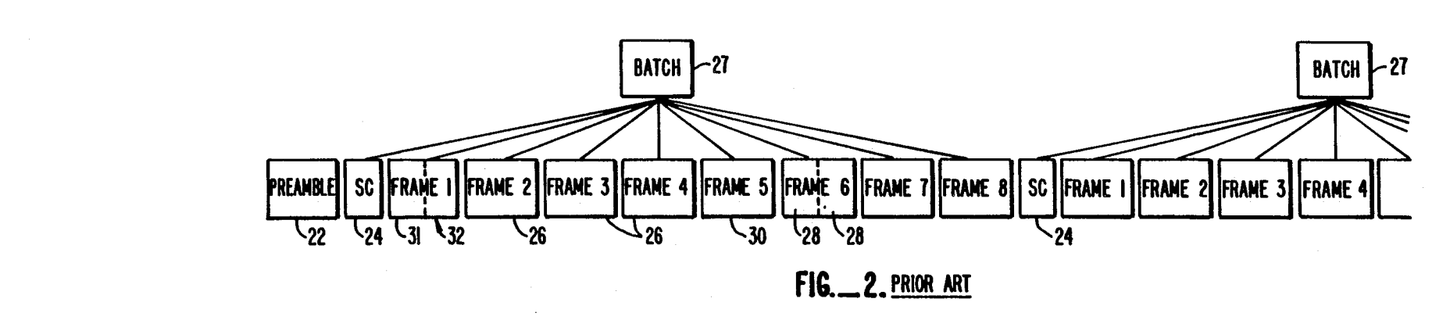
FIG. 2 illustrates the prior art POCSAG format.

There are several standard formats for paging broadcast. One format is called POCSAG. With this format any length message is possible. Also, up to two million individual pagers can be accessed through this format. Many pager manufacturers have chosen this format because of its flexibility. Pagers using the POCSAG format "listen" for a broadcast from the pager transmitter for 40 msec out of each second. If the transmitter is not active usually only noise will be "heard" by the pager. As shown in FIG. 2, a transmission is initiated by broadcasting a preamble consisting of a square wave having a minimum of 576 reversals. Since the preamble is at least 1.125 seconds in length, every pager will "hear" the preamble signal during its periodic "listening" period.

Figure 3:
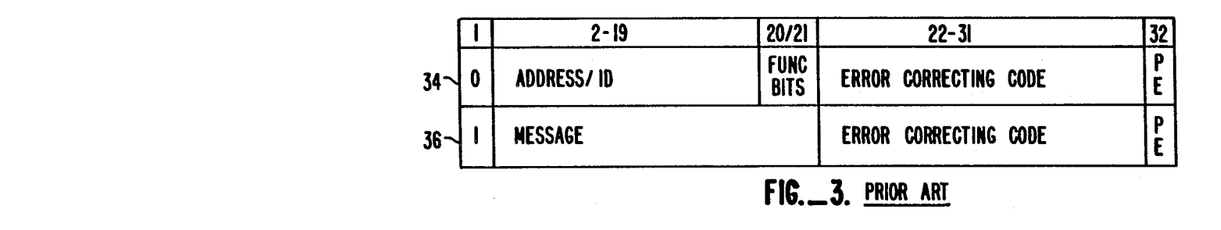
FIG. 3 shows the POCSAG format for address and message code words.

Following the preamble a 32-bit synchronization code is transmitted. The synchronization used with the POCSAG format code is the binary coded hexidecimal number 7CD215D8. Following the synchronization code are eight frames, called a batch, containing the transmitted information. Each frame is made up of two 32-bit code words. The 32-bit code words have slightly different formats based upon whether they contain an address, identifying which of the two million pagers the message is intended for, or a message. FIG. 3 shows that a code word containing an address has the most significant bit set to 0 while a code word containing a message has the most significant bit set to 1.

Conventional pagers using the POCSAG format do not monitor each frame. Rather, each individual pager monitors only one of the frames, such as frame 5, to save their batteries. Thus, after the synchronization code is received the individual pager will not monitor the transmission until it is time for frame 5 to be transmitted. Since each frame takes 121.6 milliseconds, the pager in this example would start monitoring the transmitting transmission somewhat before 486.4 milliseconds after the end of the synchronization code. After monitoring its particular frame, the pager once again stops monitoring the broadcast until it is time for the next synchronization code to be broadcast, at which time the cycle starts again. Transmission of the synchronization codes allows the pagers to be synchronized with the broadcast to reduce timing errors. If there is no message to be transmitted in any of the eight frames in a particular batch, an idle code word (7A89C197) is transmitted in each of the two code words for that frame. This tells the pagers monitoring that frame that no message is being transmitted for those pagers during that batch.

One drawback of the presently available pager systems is that they are not intended to provide the same message to more than one recipient. Therefore, if one wanted to ask a group of people with pagers to, for example, call a certain telephone number, the same message would need to be broadcast once for each recipient.

SUMMARY OF THE INVENTION

The present invention is directed to a pager based information transmission system which uses a standard paging broadcast format to transmit both conventional private messages and unconventional multi-recipient messages. The multi-recipient messages are received by only those individual pagers with authorized access to the multi-recipient message. The authority to receive the multi-recipient message can be regulated in two different ways. The authority to receive certain types of multi-recipient messages is provided in the pager at the time of manufacture. This type is authority can be provided by entering an authorization code for that class or type of multi-recipient message in the ROM of the pager. In the preferred embodiment this class of multi-recipient messages is called database messages; such messages will be referred to as database messages for sake of simplicity. The authorization code for a type of database message is called, in this application, the database ID.

The authority to receive another type of multirecipient message, called a group message in this application, is provided by an add/delete group ID message broadcast over the air. A group ID is therefore typically found in a special area in the read/write memory of the pager. This ability to add and delete group IDs to and from individual pagers provides the system with great flexibility, as will become apparent below.

The system preferably uses software-controlled pagers having read/write memories for storage of broadcast messages and for modifying the operation of selected pagers through over-the-air broadcasts. This arrangement permits great flexibility in the pager operation. For example, in the preferred embodiment the beeper tone can be varied by broadcast instructions stored in a particular address in the read/write memory. Likewise the internal memory organization for a certain class of multi-recipient messages (discussed below) can be altered as necessary by broadcasts.

The use of software controlled pagers has other significant advantage. One aspect of the invention is the recognition and appreciation that because high speed is not required, the various functions usually performed by components external of the processor, including those performed by read/write bus control chips, chip select logic control chips and address logic chips, can be performed by the software in the microprocessor. Since all basic operations are performed by a processor and RAM, the hardware required is greatly reduced in contrast with the requirements of conventionally designed microprocessor based systems. This reduces the cost and size of the pager.

The system provides for a hierarchy of storage and retrieval of multi-recipient messages. In the preferred embodiment only database; messages are stored and retrieved in this way. (A hierarchial system of message storage and retrieval can be used for group messages as well.) Assume that one database is sports. A four-level hierarchy or tree could be used to separate the sports information into, for example, four different sports, four divisions per sport, six teams per division and up to four pages of information for each team. (In the preferred embodiment each page of information constitutes four twenty-character lines since the pager display has a display with four twenty-character lines.) It is preferred that the hierarchy or tree structure be changeable by over-the-air broadcasts. Therefore, when football season is over, football could be deleted as a sport and baseball added. The broadcast changeable hierarchy structure for the database information provides the system with great flexibility in the organization, storage and access of database information.

Another aspect of the invention is that it provides the user with a real time pager clock. Using the pager clock, private and multi-recipient message can be date and time stamped with the date and time of receipt. This permits the user not only to know when a message was received, but allows the user to review messages in, for example, chronological or reverse chronological order.

The pager clock, according to one aspect of the invention, is set and updated by over-the-air broadcasts of time messages. Subsequent time messages provide feedback to the pager to reset the pager clock. This is done by transmitting with each time message a time correction regarding the actual time of broadcast of the previous time message. This over-the-air updating of a real time clock may be useful in a wide variety of applications.

The pager itself preferably includes a microprocessor having an internal RAM, used to store time information; and an internal ROM, on which the unique pager ID and one or more database IDs are fixed at the time of manufacture. The microprocessor is, in the preferred embodiment, coupled to a conventional receiver/decoder, used to receive the broadcast signal from the transmitter and convert the signal to a digital form useable by the microprocessor. The microprocessor is also coupled to a display, user input buttons and a RAM. The RAM has allocated regions for private messages, group messages and database messages. (In the preferred embodiment both private and group messages are stored in one region in RAM in the order in which received.) Other broadcast information, such as the database messages relating to hierarchy of retrieval and the menu, are also stored in RAM. The input buttons are used to control the display of both private and multi-recipient messages. For example, the user can choose the sports database, the particular sport, the division and the team so to access the database information stored in RAM on that team. When the private and group messages are stored together, then accessing these messages together in reverse chronological order will cause private and group messages to be displayed by the pager intermixed with one another according to the time of receipt. In such cases the message itself can indicate if it is a private or a group message. Other input buttons may be provided to initiate other operations, such as review first message, scroll through messages and delete messages.

Another feature of the invention involves the transmission of private messages to every pager. This is accomplished by transmitting a special "all pager ID" with the message. The pager will then read the pager ID and store the message if the transmitted pager ID (also called an address) is either the pager ID for that particular pager or all pager ID, which can be incorporated into the microprocessor program. In either event the message would be stored in the pager. This provides an additional type of broadcast message using a conventional pager format.

An additional feature of the invention is the ability of the user to flag certain types of messages. For example, assume that the user wants to know when information regarding a certain baseball team has been updated. The user could flag the page number in RAM relating to that team so that when that page number is addressed by the microprocessor an indication, typically an audible tone, can be produced notifying the user of this.

The invention could be used in many other applications, such as security. Security personnel would each have a pager. Certain group messages could be broadcast for receipt by all pagers while others could be broadcast for receipt by only one pager (a private message) or a selected group of pagers (a group message). Messages could be tagged so the user cannot erase the message to provide a record of messages received by that user.

Other features and advantages of the invention will appear from the following description in which the preferred embodiment has been set forth in detail in conjunction with the accompanying drawings.

DETAILED DESCRIPTION OF THE PREFERRED EMBODIMENT

Figure 1:
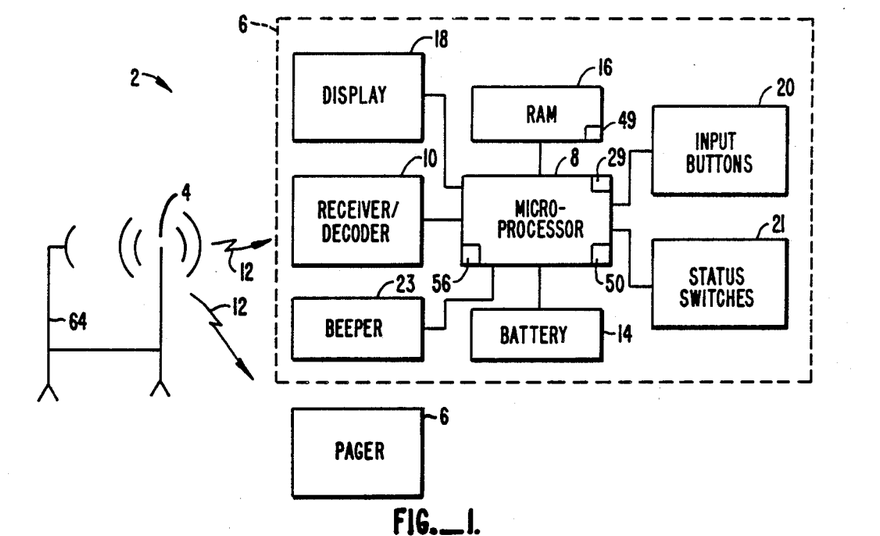
FIG. 1 is a schematic representation of a pager based information system of the invention.

Referring now to FIG. 1, a pager based information transmission system 2 is seen to include a pager system transmitter 4 and a number of pagers 6. Each pager 6 includes a microprocessor 8 coupled to a receiver/decoder 10 which receives broadcast signals 12 from transmitter 4 and transforms these signals to digital form acceptable by microprocessor 8. Microprocessor 8, powered by a battery 14, stores selected private messages in random access memory (RAM) 16 for viewing by the user on display 18 through the user manipulation of input buttons 20 and status switches 21. A beeper 23, connected to microprocessor 8, is used to provide the familiar beeping sound when certain types of messages are received according to the position of status switches 21. To determine how system 2 works, the POCSAG pager transmission format will be discussed with reference to FIGS. 2 and 3.

At FIG. 2 the POCSAG format is illustrated. Pager 6, since it is based upon the POCSAG format, "listens" for a broadcast signal 12 from transmitter 4 for 40 milliseconds out of each second. If transmitter 4 is not active, usually only noise will be received by microprocessor 8 so that microprocessor 8 will turn off receiver/decoder 10 for the remainder of the second to conserve battery 14. A broadcast signal 12 from transmitter 4 is initiated by a preamble 22 which consists of a square wave having a minimum of 576 reversals. The square wave frequency is such that the preamble lasts at least 1.125 seconds. Therefore, every pager 6 will have its receiver/decoder 10 turned on sometime during preamble signal 22.

Following preamble 22 a 32-bit synchronization code 24 is transmitted. Synchronization code 24 used with the POCSAG format is the binary coded hexidecimal number 7CD215D8. Following synchronization code 24, eight frames 26, each 64 bits in length, are transmitted. Synchronization code 24 plus the eight frames 26 make up a batch 27. Each frame is made up of two 32-bit code words 28. Code word 28 has a slightly different format based upon whether it contains an address or a message. As seen in FIG. 3, if the most significant bit, identified as bit 1 in FIG. 3, is set to 0, bits 2–19 contain a pager ID or address while if bit 1 is set to 1, bits 2–21 contain a message. In the transmission of private messages, the address is the unique pager ID which must match the pager ID in the ROM 29 in microprocessor 8. The remaining bits are used primarily for error correction.

Pager 6, as is conventional under the POCSAG format, does not leave its receiver/decoder 10 on to monitor broadcast signal 12 for each frame 26. Rather, microprocessor 8 has receiver/decoder 10 monitor only a particular one of the eight frames, such as the fifth frame 30. After synchronization code 24 is received by receiver/decoder 10 and provided to microprocessor 8, microprocessor 8 turns off receiver/decoder 10 until, in this example, fifth frame 30 is to be transmitted. (Pager 6 also monitors the first code word 31 of first frame 32 for reasons discussed below.) Under the POCSAG format each frame takes 121.6 milliseconds to transmit so that microprocessor 8 would cause receiver/decoder 10 to begin monitoring broadcast signal 12 by 486.4 milliseconds after the end of synchronization code 24. After monitoring of fifth frame 30, microprocessor 8 instructs receiver/decoder 10 to shut off until it is time for the next synchronization code 24 to be broadcast by transmitter 4. The process then repeats. If there are no messages in any of the eight frames 26 following a synchronization code 24, an idle code word (7A89C197-which is a special address code word 34 since the most significant bit is 0) is transmitted in place of code words 28 in such frame. Receipt of an idle code word by microprocessor 8 tells the microprocessor that no message is present in that frame 26 for that batch 27.

The above-described POCSAG transmission format is conventional. Pager 6 is used to receive what is termed private messages using the conventional POCSAG format discussed above. Upon receipt of a private message, pager 6 will store the message in RAM 16 and, as is conventional, may provide an audible or visual signal to the user according to the positions of status switches 21.

Figure 4:
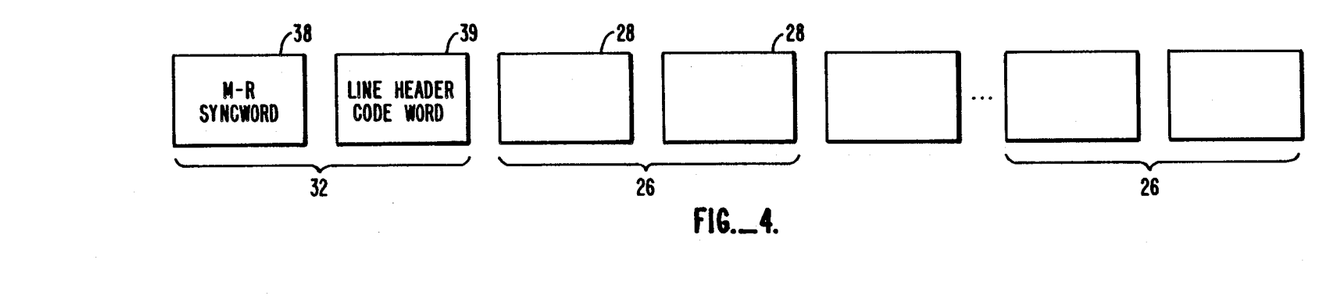
FIG. 4 illustrates the code word sequence in the multi-recipient transmission format.

System 2 differs from conventional pager systems in that it can be used for the dissemination of multi-recipient (M-R) messages which can be received by more than one pager 6. To do so a multi-recipient (M-R) syncword 38, see FIG. 4, is used as first code word 31 in first frame 32. M-R syncword 38 is identical to synchronization code 24 except that its most significant bit is changed from a 0 in synchronization code 24 to a 1 in syncword 38. Pager 6 monitors for synchronization code 24 and continues to monitor for M-R syncword 38. If M-R syncword 38 is not present, pager 6 reverts to operation under the conventional POCSAG format.

With the POCSAG format the only code word which has a 1 as its most significant bit is a message code word 36. Synchronization code 24, idle code word 38 and address code word 34 all begin with a 0 as their most significant bits. Since a message code word 36 would, under standard POCSAG format, always be preceded by an address code word 34, microprocessor 8, when it is provided an M-R syncword 38 knows that an M-R message is being transmitted. When this occurs microprocessor 8 instructs receiver/decoder 10 to continue receiving broadcast signal 12 and to continue providing signal 12 in appropriate decoded form to microprocessor 8.

The code word 28 immediately following M-R syncword 38 is a line header code word 39. Line header code word 39 includes a line header 40, see FIG. 5, and is in the format of message code word 36. (That is, the most significant bit is a 1.) Line header 40 includes twenty message bits containing various information. The first three bits of line header 40 (bits 2, 3 and 4 of line header code word 39), called database ID bits 42, are used to indicate the database (which will be discussed in more detail below); the next three bits 5–7, called memory bank bits 44, designate which of eight banks of memory in RAM 16 is to be used; bits 8 and 9 are command bits 46 identifying the message which follows as a database message (00), a group message (01), and add/delete group ID message (10) or a set clock message (11). Bits 10–21, called database memory address bits 48, are used to identify the location in RAM 16 for database messages. (Since group and private messages are stored together in RAM 16, bits 10–21 are not used unless command bits 46 equal 00.)

Assuming command bits 46 are 00, microprocessor 8 knows that broadcast signal 12 contains a database message. Microprocessor 8 reads database ID bits 42 and checks the internal ROM in microprocessor 8 to see if pager 6 is authorized to receive the database message. In the preferred embodiment, database IDs are 3-bit binary numbers so that up to eight different databases can be accommodated. In the preferred embodiment the database IDs are written in ROM at the time of manufacture of microprocessor 8, much like the pager ID is. However, the database ID could be written in a read/write memory in pager 6, as is the case with group IDs discussed below. Assuming pager 6 is authorized to receive a particular type of database message microprocessor 8 checks memory bank bits 44 to determine which of up to eight banks of memory in RAM 16 the database message is to be stored. Next, database memory address bits 46 are read for the address in RAM 16 for the database message which follows. The address is a starting address in RAM 16. Unlike the procedure pager 6 goes through with private messages, receiver/decoder 10 receives, processes and transfers to microprocessor 8 each code word 28 for the entire batch 27. If the database message continues, the process is repeated. Because first frame 32 of a batch 27 is taken up by M-R syncword 38 and line header code word 39, the remaining seven frames 26, including fourteen code words 28, are available for the database message. Since each code word 28 can be broadcast as a message code word 36, each having twenty message bits, there are a total of fourteen sets of 20-bit messages. By using 7-bit ASCII characters, one batch of a database message includes forty 7-bit ASCII characters. In the preferred embodiment display 18 has four lines of twenty characters each; therefore, each batch of broadcast signal 12 will fill up two lines or half of display 18. Since a full four-line display is referred to as a page, each batch transmits half a page of database information.

So far database messages are similar to private messages except that more than one pager 6 has the same database ID. However, with system 2, a special database message can be broadcast by transmitter 4 which sets up or modifies the tree or hierarchical structure for the database information in RAM 16. To do so the special hierarchial structure database message is written into a special location 49 in RAM 16, special location 49 identified by database memory address bits 48 in line header 40. This can be more easily described using an example. Assume that pager 6 has the proper database ID for sports. Transmitter 4 could transmit a broadcast signal 12 in the form of a database message indicating that the database message which follows is to be placed in special hierarchial instruction address 49 in RAM 16. Such a database message would typically provide for the separation of sports information into, for example, four different sports, four divisions for each sport, six teams per division and four pages of information for each team. Once set up, the user could access the database information in RAM 16 using input buttons 20. Typically one input button would be provided for each hierarchy or level possible. Thus, in this example a first input button 20 would be pushed until the name of the desired sport was shown on display 18. Then the next level of input button 20 would be pushed until the proper division, such as National League East or American League West, is provided on display 18. The appropriate team is chosen using the next button. The information stored for that team can then be viewed on display 18 using the final of four buttons 20.

Although the preferred embodiment uses a separate button for each level or location in the tree, many other methods for choosing the information from multiple locations of information can be used.

A second type of M-R message useable with system 2 is called a group message. The basic difference between group messages and private messages is as follows. With group messages more than one pager 6 will typically receive the same group message. However, unlike private messages the group message ID stored in microprocessor 8 is not permanent. Rather, the group message ID for any particular microprocessor 6 is stored in a read/write memory in microprocessor 8, typically an internal RAM 50. Like private messages, group messages do not need a special address in RAM 16. Rather, microprocessor 8 knows to store group messages in a particular part of RAM 16 allocated for that purpose. In the preferred embodiment group messages and private messages are stored in the same area of RAM 16 so that they are accessed together.

Figure 5:
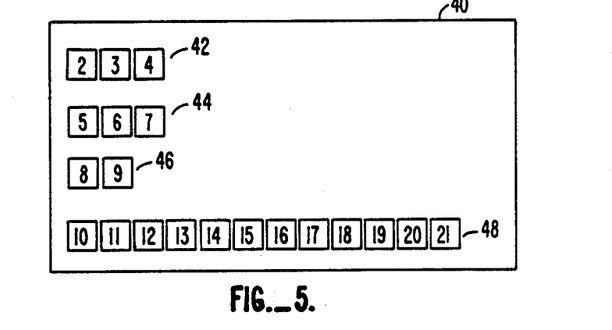
FIG. 5 identifies the four groups of bits in the line header code word of FIG. 4 which comprise the line header.
Figure 6:
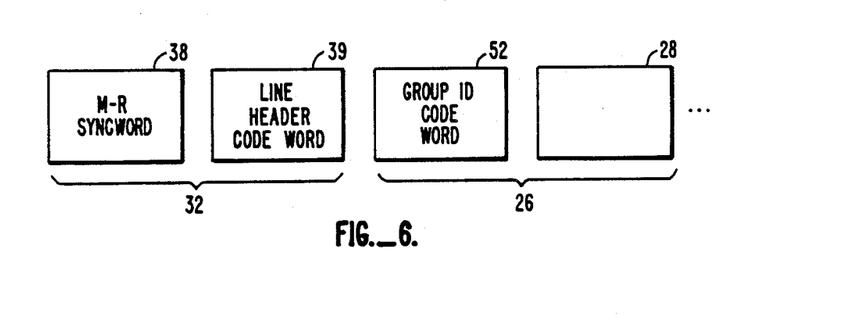
FIG. 6 illustrates the code word sequence during the transmission of a group message.

Referring now to FIGS. 5 and 6, command bits 46 of line header 40 are set to be 01 for a group message. Microprocessor 8 checks the group ID code word 52, which immediately follows line header code word 39 for group messages, and determines if pager 6 is authorized to receive this group message. Group ID code word 52 is in the format of an address/ID code word 34 and contains the group ID for the message to be broadcast in bits 6–21. (Bits 2–5 are special function bits, the purpose of which is described below.) The group ID in group ID code word 52 is compared with a list of group ID's in internal RAM 50. If pager 6 is not authorized to receive the group message, microprocessor 8 instructs receiver/decoder 10 to shut off until it is time to check for the next synchronization code 24. If pager 6 is authorized to receive the group message, then receiver/decoder 10 receives and decodes the group message from broadcast signal 12 contained in the following code words 28 of batch 27, provides the decoded message to microprocessor 8, and microprocessor 8 stores the decoded message in RAM 16. The process is repeated for the next batch 27.

Figure 7:
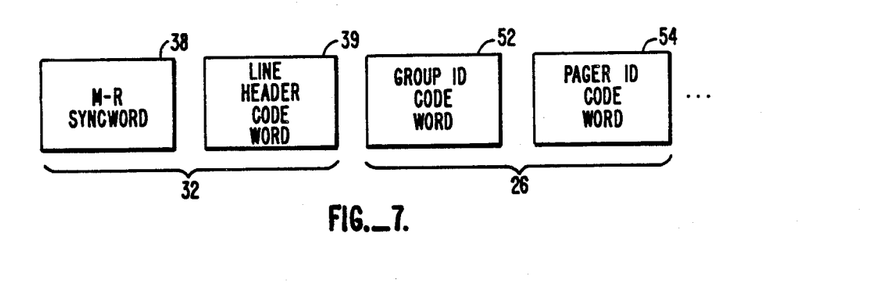
FIG. 7 illustrates the code word sequence during the transmission of an add/delete group ID message.

On occasion it is desired to add or delete group IDs from RAM 50 of a particular pager 6. To do so a group ID modification message, shown in FIG. 7, is broadcast by transmitter 4. When command bits 46 are set to 10, then a modification in the group IDs in RAM 50 is to be made. One of the special function bits 2–5 of group ID code word 52 is set to 1. (These special function bits 2–5 are all set to 0 when command bits 46 of line header 40 are set to 01.) Setting the special function bits 2 or 3 or 4 of group ID code word 52 to 1 tells microprocessor 8 to (a) add a group ID to RAM 50 of the particular pager identified in pager ID code word 54, or (b) remove a group ID from RAM 50 of the particular pager, or (c) clear all group IDs from RAM 50 of the particular pager, respectively. In the case of adding or removing a group ID, the particular group ID affected is found in bits 6–21 of group ID code word 52. Bits 2–21 of pager ID code word 54 carry the particular ID of the pager 6 to be affected by the add/delete group ID message. Accordingly, after microprocessor 8 reads the pager ID from pager ID code word 54, and if the pager ID matches the pager ID in ROM 29 of microprocessor 8, then the group ID contained in code word 52 is either added or removed from RAM 50. Of course if function bit 4 is set high, telling microprocessor 8 to clear all group IDs from RAM 50, group ID code word 52 need not contain a group ID since it would be meaningless.

Microprocessor 8 includes an internal real time clock 56 which is used to date and time stamp all group, private and database messages. Clock 56 is set and reset by time messages, shown in FIG. 8, broadcast by transmitter 4. If the time message of FIG. 8 could be broadcast at the exact time coded in day/time code word 62, clock 56 could be updated from the time message broadcast. However, the actual time of broadcast of a time message often varies by, for example, fifteen minutes from the time of broadcast listed in day/time code word 62. Therefore, the time messages of FIG. 8 cannot be used directly to set and reset clock 56. Rather, information in two time messages are used to do so in the manner discussed below.

Figure 8:
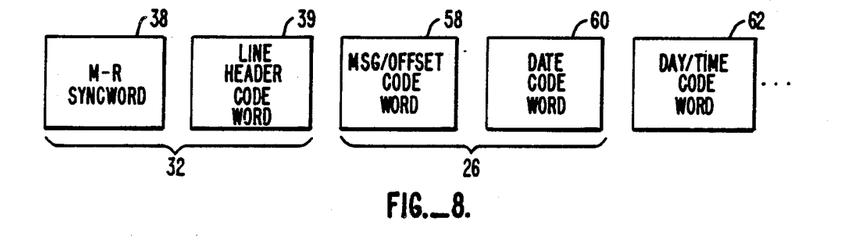
FIG. 8 illustrates the code word sequence during the transmission of a time message.

For the time messages of FIG. 8, command bits 46 in line header 40 are set to 11. The time message includes a message/offset code word 58 immediately following line header 39, a date code word 60 and a day/time code word 62 following in order thereafter. Code words 58, 60 and 62 are all of the message code word 36 type so that the most significant bit (bit 1) in each is set to 1. With message/offset code word 58, bits 2-7 identify the sequential number of the time message (time message n) while bits 8-21 contain a time correction ($C_n$) for a previous time message (time message n−1). Date code word 60 has the month (bits 2-5), day (bits 6-13) and year (bits 14-21), counting up from 1987, of time message n. Date/time code word 62 contains the day of the week (bits 2-5), the hour of broadcast on a twenty-four hour basis (bits 6-13), and the minute of broadcast (bits 14-21) for time message n.

Microprocessor 8 reads and stores the information in code words 58, 60 and 62. Also, microprocessor 8 stores the actual time of receipt of the time message of FIG. 8 as determined by real time clock 56. There is room in RAM 50 for this time data for at least two time messages plus associated times of receipt from real time clock 56. To update real time clock 56 after transmission of a time message n (taken from bits 2-7 of message/offset code word 58), the following computation is made:

$$T_{n(new)} = t_{n-1} + C_n + (T_n - T_{n-1}),$$

Where:

$T_{n(new)}$ is the updated time used to reset real time clock 56, $T_n$ is the time of receipt of time message n taken from real time clock 56, $T_{n-1}$ is the time of receipt of time message n'1 taken from real time clock 56, $t_{n-1}$ is the time taken from the day/time code word 62 of time message n−1, and $C_n$ is the time correction taken from the message/offset code word 58 of time message n.

In addition to updating real time clock 56, $T_{n(new)}$ is also used to replace $T_n$ in RAM 50. Note that $C_n$ is that correction value broadcast by time message n but is used to correct the time broadcast by time message n−1. Using this method an extremely accurate real time clock 56 is provided the user with no user input and without the requirement that the time signal be delivered at an exact time. This aspect of the invention is considered to be useful in other circumstances. For example, the real time clock in a VCR could be updated in this way.

The difference between the time in day/time code word 62 and actual time of the broadcast of the time message of FIG. 8 is preferably determined by transmitter 4 by using a separate receiver 64 near transmitter 4, receiver 64 being hand wired to the transmitter. From this transmitter 4 can compute time correction $C_n$.

If desired message/offset code word 58 can include a bit which designates the time message as either the time correction message discussed above or a pager shut-off message. For example, setting bit 2 high can indicate that the time message is a time correction message while setting bit 2 low can indicate that microprocessor 8 is to shut off receiver/decoder 10 until the date and time in code words 60, 62.

Turning now to FIGS. 9A-9E, the basic steps followed by microprocessor 8 will be described in terms of a flow diagram. Microprocessor 8 checks broadcast signal 12 for preamble 22 at 70. If preamble 22 is found, microprocessor 8 checks for synchronization code 24 at 72. If no synchronization code 24 is found, control returns to return position 74. If synchronization code 24 is found, code word 31 is read at 76. If code word 31 equals M-R syncword 38, line header 39 is read at 78. Command bits 46 of header code word 39 are read at 80 and determine where control passes to. If command bits 46 equal 00, control is passed to database message position 82; if 01, control is passed to group message position 84; if 10, control is passed to change group message position 86; if 11, control is passed to time message position 88. If code word 31 is not M-R syncword 38, pager 6 operates as a conventional POCSAG format pager by reading a chosen one of the eight frames of the batch 27 at 90, determining if there is a private message for that particular pager 6 at 92 and if so, reading and storing the private message at 94. Control then returns to 74.

Figure 9A:
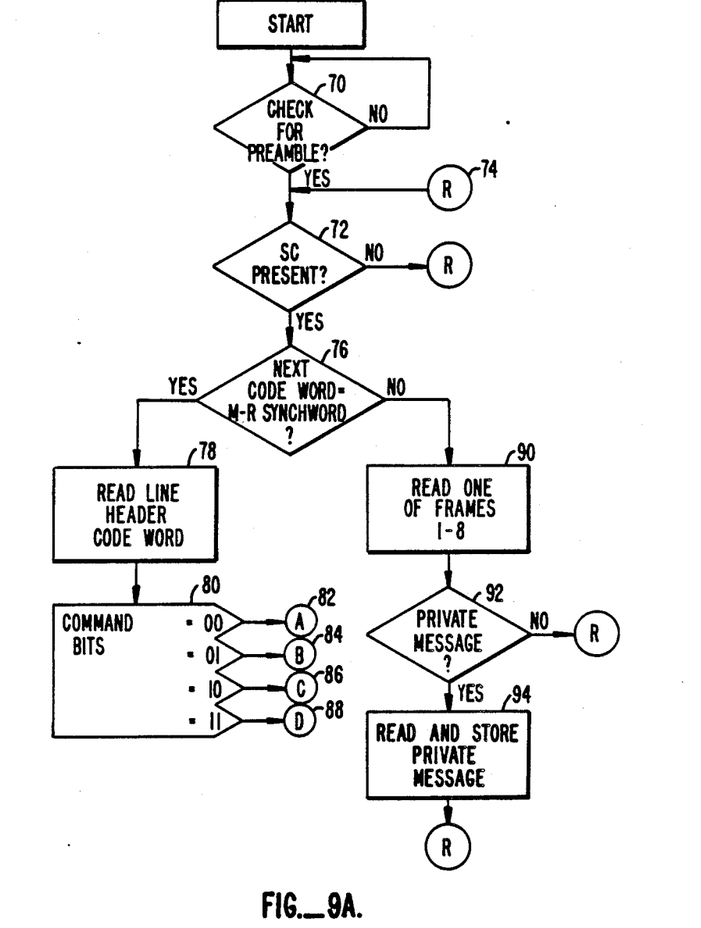
FIGS. 9A through 9E are flow diagrams illustrating the basic sequence of events followed by the microprocessor of FIG. 1.
Figure 9B:
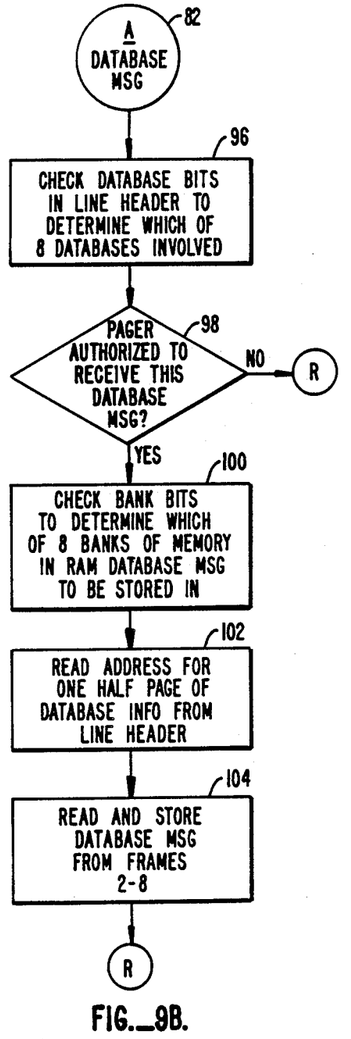

Turning now to FIG. 9B, the program steps used with a database message will be discussed. At 96 database ID bits 42 in line header 40 are checked to determine which database the message pertains to. At 98 microprocessor 8 checks to see whether pager 6 is authorized to receive the database message by comparing the database ID bits 42 with the list of database IDs in ROM 29. If yes, then memory bank bits 44 are checked to determine which bank of memory the database message is to be stored in at 100. The address for one half page of database information is read from bits 48 of line header 40 at 102. Finally, at 104, pager 6 reads and stores the database message from the remaining frames of batch 27. Control then returns to position 74.

Figure 9C:
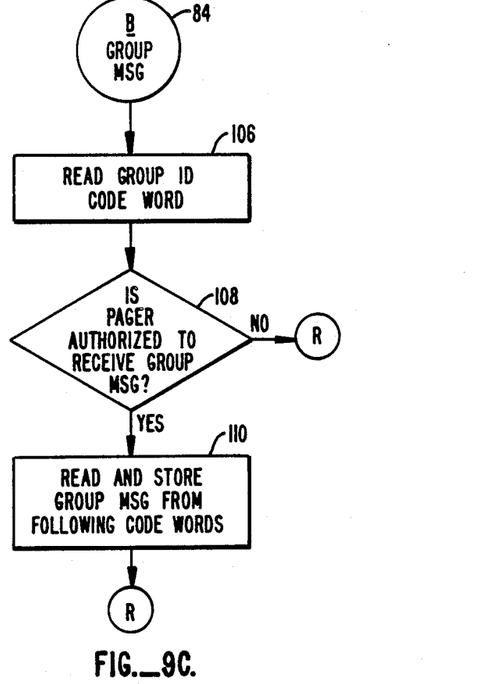

At FIG. 9C, the handling of a group message is shown. Group ID code word 52 (see FIG. 6) is read at 106. If pager 6 is authorized to receive the following group message, determined at 108 by comparing the group ID and code word 52 with the group IDs in RAM 50 of microprocessor 8, pager 6 reads and stores the group message in RAM 16 from code words 28 in batch 27 at 110 and then returns to position 74.

Figure 9D:
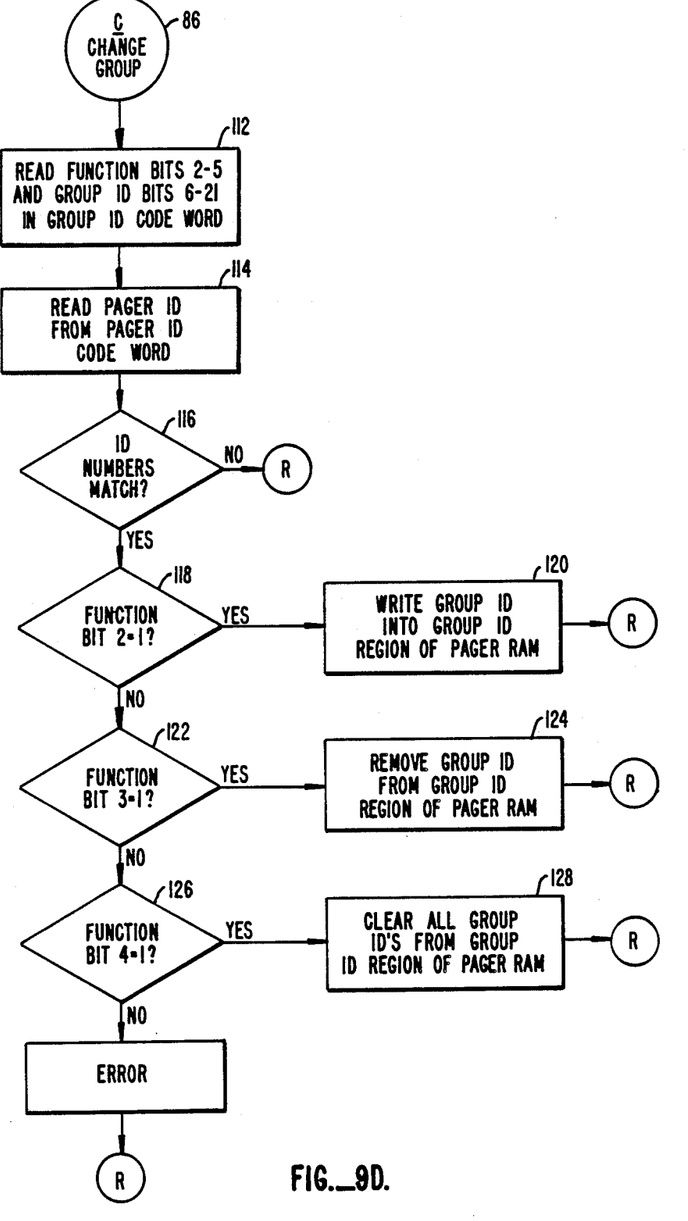

Referring now to FIGS. 7 and 9D, a change group message in group ID code word 52 is read at 112. At position 114 a pager ID is read from pager ID code word 54. If the pager ID numbers match, determined at 116, then at 118 it is determined if bit 2 of code word 52 equals 1 (referred to as function bit 2 in FI. 9D). If so, the group ID is written into RAM 50 of microprocessor 8 at 120; if bit 2 does not equal 1, then bit 3 of code word 52 is interrogated at 122. If bit 3 equals 1, then group ID in RAM 50 which matches the group ID in the group ID code word 52 is removed from RAM 50 at 124. If bit 3 does not equal 1, bit 4 is interrogated at 124. If bit 4 equals 1, then all group IDs in RAM 50 are cleared at position 128. Control then returns to 74.

Figure 9E:
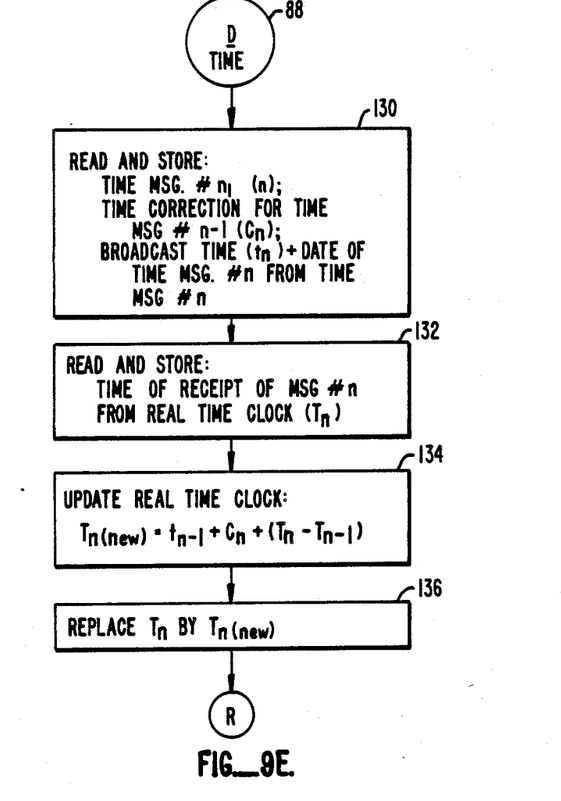

Referring now to FIGS. 8 and 9E, a basic flow diagram for a time message is described. First, at position 130 pager 6 reads and stores time message number (n) and the time correction (or offset) for time message number n−1 ($C_n$) from code word 58. The date, day and time of time message n are read and stored in RAM 50. Next, at 132, the actual time of receipt of time message number n ($T_n$) as determined from real time clock 56, is stored in RAM 50. Next, at 134, the real time clock is updated and set to $T_{n(new)}$ at 136. Thereafter the program returns to position 74.

Modification and variation can be made to the disclosed embodiment without departing from the subject of the invention as defined in the following claims.

We claim:

1. A method for disseminating different types of information to different sets of recipients using a pager based broadcast system of the type including a transmitter and pagers, each pager having a pager memory containing a unique pager ID, the pager memory including a read only memory and a read/write memory, comprising the following steps:
   (a) transmitting a multiple-recipient (M-R) message by the transmitter according to a pager format, the M-R message including an M-R ID corresponding to a chosen set of the pagers, each pager in the chosen set of pagers having the M-R ID stored in the pager memory, the transmitting step including the step of transmitting a database structure message;
   (aa) structuring at least a portion of the read/write memory of the at least one pager according to the database structure message;
   (b) monitoring the M-R messages by the pagers;
   (c) receiving the M-R message by at least one pager of the chosen set of pagers; and
   (d) storing the M-R message at a database structure location in the structured portion of the read/write memory of the at least one pager.

2. The method of claim 1 further comprising:
   (e) transmitting a private message according to the pager format, the private message including a selected pager ID;
   (f) monitoring for private messages by the pagers;
   (g) receiving the private message by at least the selected pager; and
   (h) acting on the private message by the selected pager.

3. The method of claim 2 wherein the (h) acting step includes the step of indicating the receipt of the private message by the selected pager.

4. The method of claim 3 wherein the receipt indicating step is carried out by providing a signal by the selected pager.

5. The method of claim 4 wherein the receipt indicating step is carried out by providing a sound signal by the selected pager.

6. The method of claim 2 wherein the (h) acting step includes the step of storing the private message in the read/write memory of the selected pager.

7. The method of claim 6 further comprising the steps of flagging a chosen memory location and providing a pager signal upon the writing of a private message at the chosen memory location.

8. The method of claim 6 further comprising the step of selectively accessing the private message.

9. The method of claim 1 wherein the acting step includes the step of indicating the receipt of the M-R message by the at least one pager.

10. The method of claim 1 wherein the acting step includes the steps of:
    checking a real time clock in the pager at the time of receiving the M-R message; and
    storing the M-R message and the time of receiving the M-R message in the read/write memory of the at least one pager.

11. The method of claim 1 wherein the transmitting step is carried out by transmitting M-R data messages and by transmitting M-R modification messages.

12. The method of claim 11 wherein the step of transmitting M-R modification messages is carried out by transmitting an M-R modification message including a first pager ID and an M-R modification instruction.

13. The method of claim 12 wherein the M-R modification message transmitting step is carried out by transmitting an M-R modification instruction which instructs the pager with the first pager ID to add an M-R to the read/write memory of said pager.

14. The method of claim 12 wherein the M-R modification message transmitting step is carried out by transmitting an M-R modification instruction which instructs the pager with the first pager ID to delete at least one M-R ID from the read/write memory of said pager.

15. The method of claim 1 wherein the database structure transmitting step is carried out by transmitting a database structure message defining a multi-level organization for database messages stored in the read/write memory.

16. The method claim 15 further comprising the step of selectively accessing a database message stored in the read/write memory using the multi-level organization of the database structure message.

17. The method of claim 16 wherein the selectively accessing step is accomplished by pressing at least one input button of the at least one pager corresponding to the database message at the organization level desired.

18. The method of claim 16 wherein the selectively accessing step includes the step of visually displaying the accessed database message.

19. The method of claim 1 wherein the storing step includes the step of storing the M-R message at a chosen location in the read/write memory.

20. The method of claim 19 further comprising the steps of flagging the chosen memory location and providing a pager signal upon the writing of an M-R message at the chosen memory location.

21. The method of claim further comprising the step of transmitting a shut-down signal to the pagers and wherein the monitoring step includes the step of temporarily suspending monitoring for M-R messages according to the shut-down signal.

22. A method for disseminating different types of information to different sets of recipients using a pager based broadcast system of the type including a transmitter and pagers, each pager having a pager memory containing a unique pager ID, the pager memory including a read only memory and a read/write memory, comprising the following steps:
   (a) transmitting multiple-recipient (M-R) messages by the transmitter according to a pager format, each M-R message including an M-R ID corresponding to a chosen set of the pagers, each pager in the chosen set of pagers having the M-R ID stored in an M-R ID location in the pager memory;
   (b) monitoring the M-R messages by the pagers;
   (c) receiving the M-R message by at least one pager of the chosen set of pagers;
   (d) storing the M-R message in the read/write memory of the at least one pager;
   (e) the (a) transmitting step including chosen ones of the steps of:
      e(1) transmitting an M-R data message, the M-R data message being stored in the read/write memory at one of a plurality of M-R data location;

e(2) transmitting an M-R modification message including a first pager ID and an M-R ID modification instruction for modifying the information in the M-R ID location; and e(3) transmitting an M-R storage modification message for modifying the storage structure of at least one of the plurality of M-R data locations; and (f) selectively accessing the M-R data message in the read/write memory of the at least one pager.

23. The method of claim 22 wherein the e(2) M-R modification message transmitting step is carried out by transmitting an M-R modification instruction which instructs the pager with the first pager ID to add an M-R ID to the read/write memory to said pager.

24. The method of claim 22 wherein the e(2) M-R modification message transmitting step is carried out by transmitting an M-R modification instruction which instructs the pager with the first pager ID to delete at least one M-R ID from the read/write memory of said pager.

25. The method of claim 22 wherein the e3) M-R storage modification transmitting step is carried out by transmitting a database structure messages defining a multi-level organization for M-R data messages stored at the plurality of M-R data locations in the read/write memory.

26. The method of claim 25 wherein the selectively accessing step includes the steps of:

selectively accessing a chosen level of M-R data messages stored in the read/write memory using the multi-level organization; and visually displaying the chosen level of M-R data messages.

27. The method of claim 22 further comprising the steps of:

(g) transmitting a private message according to the pager format, the private message including a selected pager ID;

(h) monitoring for private messages by the pagers;

(i) receiving the private message by at least the selected pager;

(j) acting on the private messages by the selected pager by indicating receipt of the private message and storing the private message in the read/write memory of the selected pager; and (k) selectively visually displaying the stored private message on the selected pager.

28. A method for disseminating different types of information to different sets of recipients using a pager based broadcast system of the type including a transmitter and pagers, each pager having a pager memory containing a unique pager ID, the pager memory including a read only memory and a read/write memory, comprising the following steps:

transmitting a multiple recipient (M-R) message by the transmitter according to a pager format, the M-R message including an M-R ID corresponding to a chosen set of the pagers, each pager in the chosen set of pagers having the M-R ID stored in the pager memory;

the transmitting step being carried out by transmitting M-R data messages and by transmitting M-R modification messages including a first pager ID and an M-R modification instruction;

monitoring for M-R messages by the pagers;

receiving the M-R message by at least one pager of the chosen set of pagers; and acting on the M-R message by the at least one pager, the acting step including the step of instructing the pager with the first pager ID to add/delete and M-R ID to/from the read/write memory according to the M-R modification instruction.

29. The method of claim 28 wherein the acting step includes the step of storing the M-R message in the read/write memory of the at least one pager.

30. The method of claim 29 wherein the transmitting step includes the step of transmitting a database structure message and the storing step includes the step of storing the database structure message at a database structure location in the read/write memory.

* * * * *